US005469303A

United States Patent [19]

Wun et al.

[11] Patent Number: 5,469,303

[45] Date of Patent: Nov. 21, 1995

[54] BRIGHTNESS COMPENSATION FOR A LAMP SHADE IN AN OPTICAL SCANNER

[75] Inventors: Jeffrey Wun; Ting Shia; Fang-Merng Guo, all of Hsinchu, Taiwan

[73] Assignee: Umax Data Systems Inc., Hsinchu, Taiwan

[21] Appl. No.: 254,942

[22] Filed: Jun. 7, 1994

[51] Int. Cl.[6] .................. G02B 27/00

[52] U.S. Cl. .................. 359/896; 355/71; 362/260; 362/296

[58] Field of Search .................. 359/208, 223, 359/196, 896; 355/67, 69, 71; 362/84, 217, 223–224, 260, 296, 310–311, 347–348

[56] References Cited

U.S. PATENT DOCUMENTS 4,891,664 1/1990 Kanai .................. 355/71

*Primary Examiner*—Paul M. Dzierzynski
*Assistant Examiner*—James Phan
*Attorney, Agent, or Firm*—W. Wayne Lianh

[57] ABSTRACT

An improvement of brightness compensation for a lamp shade in an optical scanner includes a plurality of projections to make a reflector in the lamp shade to form a greater curvature on its lateral sides, thus increase the light-condensing capability of the reflector, and thereby improve brilliance uniformity of a lamp tube.

2 Claims, 4 Drawing Sheets

BRIGHTNESS COMPENSATION FOR A LAMP SHADE IN AN OPTICAL SCANNER

BACKGROUND OF THE INVENTION

This invention relates to an optical scanner and the like. In a conventional optical scanner for documents or graphics, an internal light source is used to project onto a document, and the reflecting light is picked up by a charged coupled device (CCD) for the scanning process. The stability and uniformity of the light source directly affect the scanning quality. This is particularly true for a scanner which has gray-scale or color function. Proper light projection is needed so as to not obscure the signal received by CCD and impair the color tint or illumination level and result in poor scanning quality.

Referring to FIG. 1 for a light source structure of a conventional optical scanner, a lengthy lamp stand (10) is employed to match the size of the scanning documents, lamp stand (10) has a lamp shade (11) which has a reflector (12) disposed inside. The reflector (12) is used for light-condensing or light-compensating for lamp tube (13). However fluorescent lamp tube (13) has a characteristic or deficiency, i.e., it has lower brilliance at the two lateral sides. This deficiency produces uneven brilliance and results in uneven illumination on the scanning document, and consequently impairs the scanning quality.

Therefore, there is still a need for improvements on the light source control in a conventional optical scanner.

SUMMARY OF THE INVENTION

It is accordingly an object of the present invention to provide an improvement on brightness compensation for a lamp shade in an optical scanner.

The present invention intends to provide a lamp shade which includes a plurality of protrudent means upon which to mount a reflector so that the reflector can have greater curvature at the lateral sides, thus increasing the light-condensing capability of the reflector. It consequently improves the brilliance uniformity in axial direction of the lamp tube and results in a more balanced illumination on the scanning object.

The present invention further was developed to provide a simple structure which will improve the light source quality of an optical scanner, without making a huge change to the original structure, nor increasing much of the cost for additional components.

DETAILED DESCRIPTION OF THE PREFERRED EMBODIMENT

Figure 1:
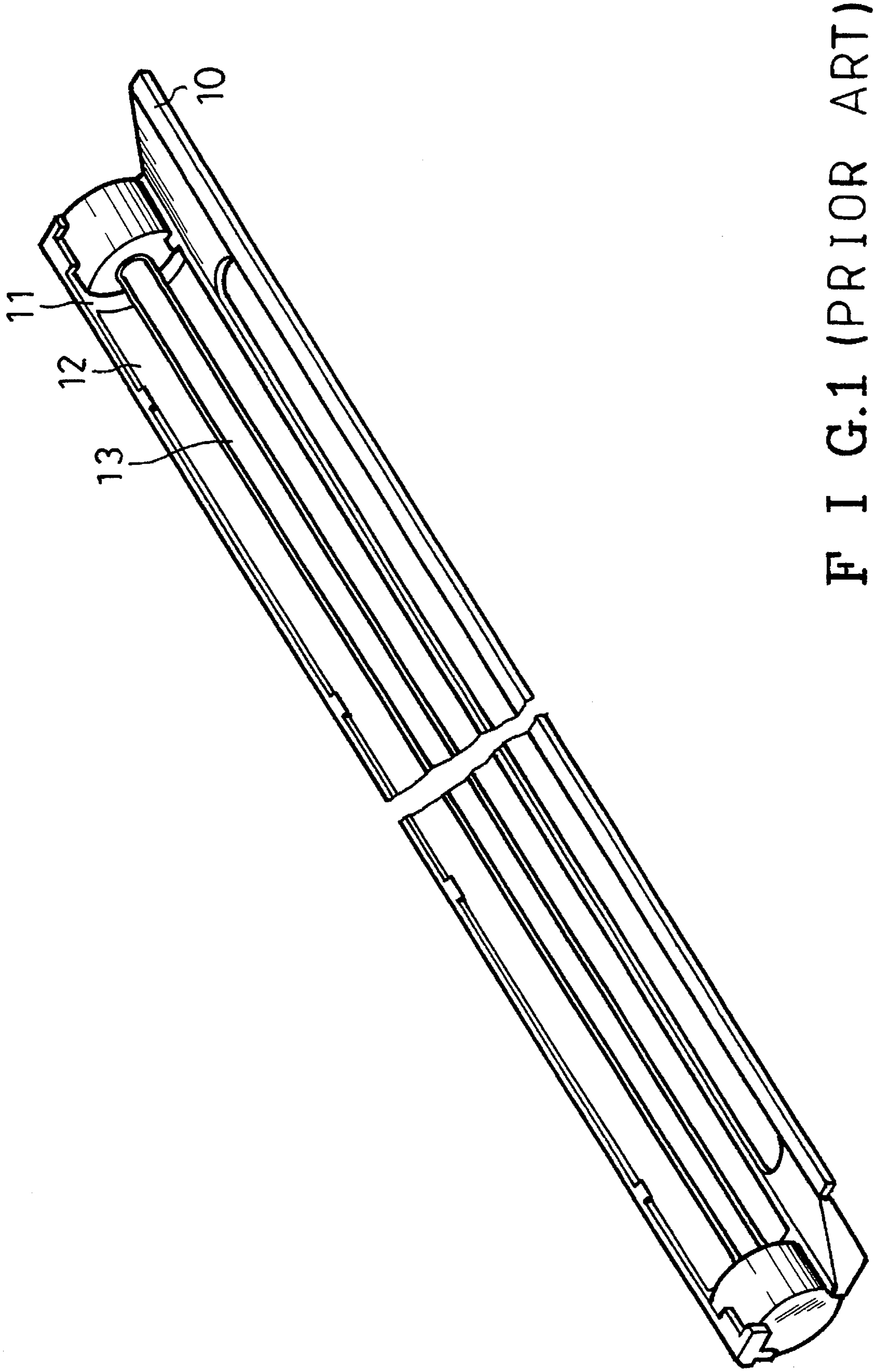
F I G.1 (PRIOR ART)
FIG. 1 is a perspective view of a lamp stand of a conventional optical scanner.
Figure 2:
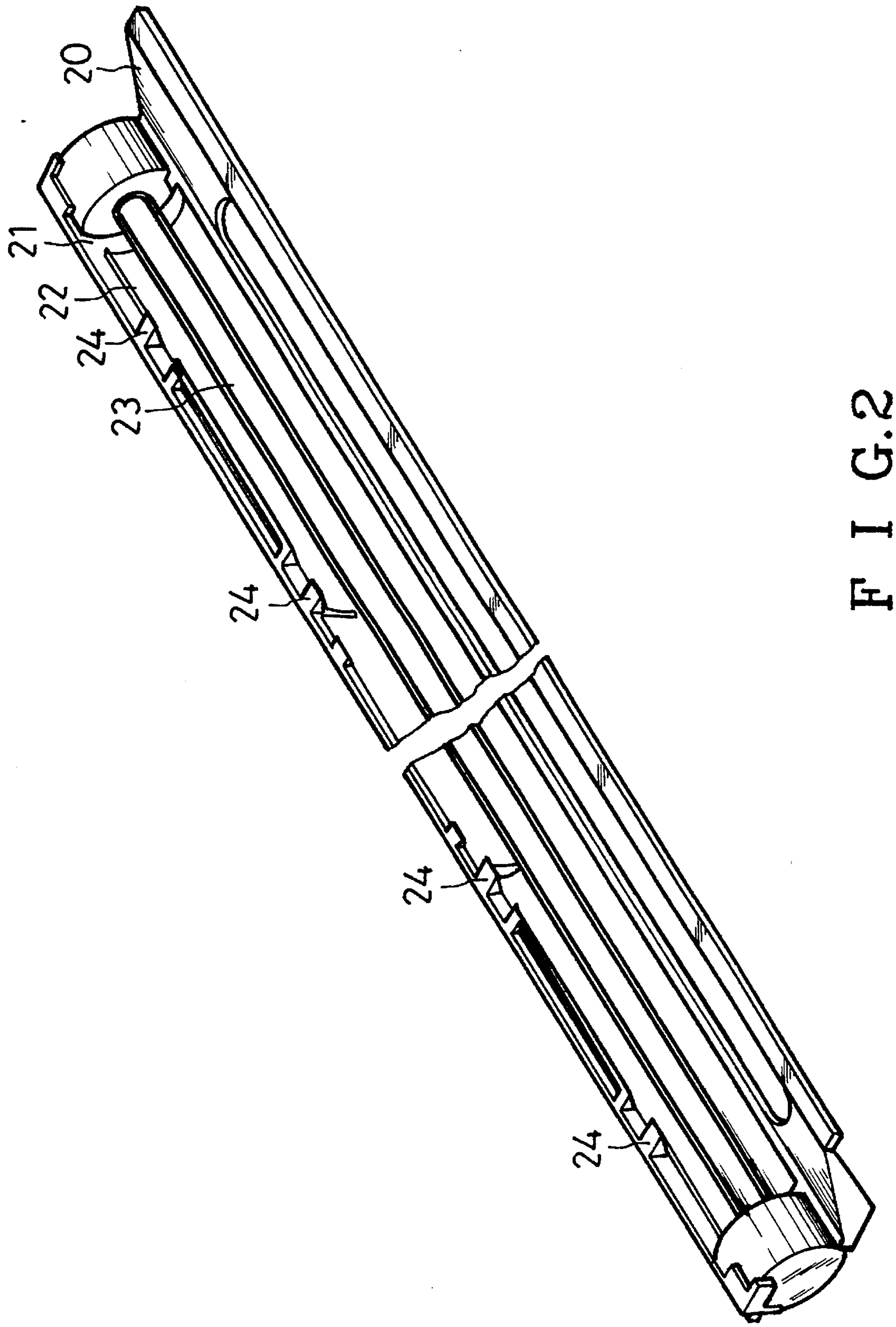
FIG. 2 is a perspective view of an embodiment of a lamp stand of the present invention.

Referring to FIG. 2 for a preferred embodiment of the present invention, lamp stand (20) is generally structured like that of a conventional lamp stand with a fluorescent lamp tube (23) arranged in the center axially. Lamp shade (21) has a reflector (22) which is placed inside. The present invention is characterized by having a plurality of protrudent means (24) formed on the two lateral sides of lamp shade (21). The protrudent means allow the reflector (22) to form a curved surface inward and have a greater curvature, thus increasing the light-condensing capability at the two lateral sides, and thereby improving the brilliance uniformity axially along lamp tube (23).

Figure 3:
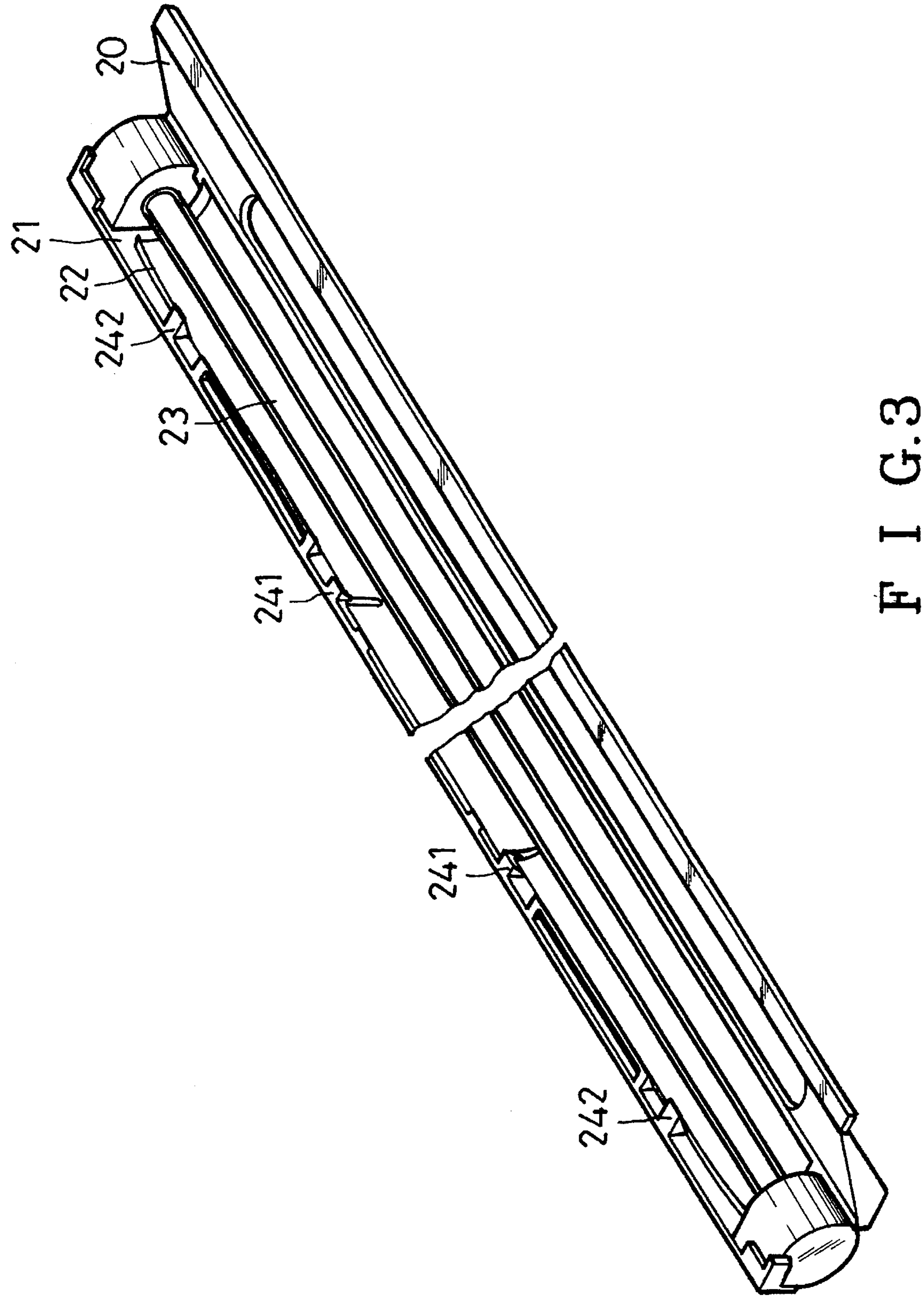
FIG. 3 is a perspective view of another embodiment of a lamp stand of the present invention.
Figure 4:
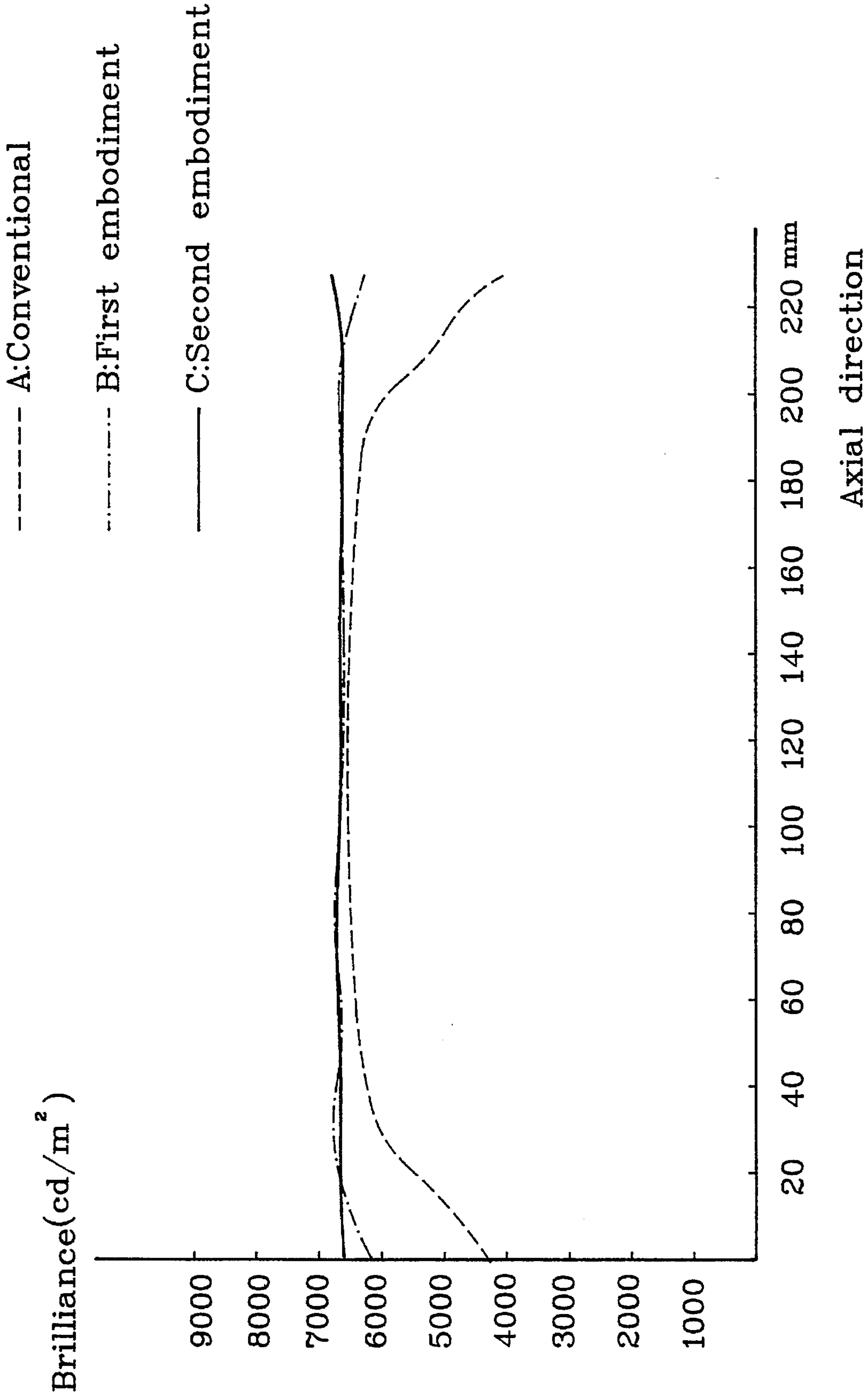
FIG. 4 is a schematic diagram illustrating the axial brilliance of the present invention and a conventional lamp stand.

Referring to FIG. 3 for another preferred embodiment of the present invention, protrudent means (24) can be made different according to the brilliance characteristics of a lamp tube (23) in axial direction. E.g. inside protrudent means (241) is made smaller than outside protrudent means (242), so that reflector (22) has a greater curvature outside than inside, thus can further improve the brilliance uniformity axially along lamp tube (23).

It is to be understood that the description and preferred embodiments set forth above are only to serve for illustrative purpose, and do not intend to limit the scope of the present invention, After considering these examples, skilled persons will understand that variations may be made without departing from the principles and scope of the present invention.

What is claimed is:

1. An improvement of brightness compensation for a lamp shade in an optical scanner, comprising:

- a lamp stand having a lamp tube disposed longitudinally in the center;
- a lamp shade attached to said lamp stand and having a reflector disposed between two lateral sides of said lamp shade;
- a plurality of protrudent means formed on the lateral sides of said lamp shade on which the reflector is attached, said plurality of protrudent means cause the reflector to have a greater curvature at the lateral sides than that in a middle portion of the reflector.

2. An improvement of brightness compensation for a lamp shade of claim 1, wherein said protrudent means are arranged in such a manner that they are smaller in an axially inside portion of said reflector and are bigger near the two axial ends of said reflector, so as to cause said reflector to have a greater curvature near its axial ends.

* * * * *